United States Patent
Beck et al.

(10) Patent No.: US 9,576,263 B2
(45) Date of Patent: Feb. 21, 2017

(54) CONTEXTUALIZED REPORT BUILDING

(71) Applicant: Oracle International Corporation, Redwood Shores, CA (US)

(72) Inventors: Celine Beck, Montreal (CA); Thierry Bonfante, Montreal (CA); Sherry Ellen Mead, San Francisco, CA (US); Artashes Gamarian, Montreal (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 309 days.

(21) Appl. No.: 14/032,172

(22) Filed: Sep. 19, 2013

(65) Prior Publication Data

US 2015/0082219 A1    Mar. 19, 2015

(51) Int. Cl.
*G06T 11/20* (2006.01)
*G06Q 10/06* (2012.01)
*G06F 17/30* (2006.01)

(52) U.S. Cl.
CPC ... *G06Q 10/0639* (2013.01); *G06F 17/30522* (2013.01); *G06F 17/30554* (2013.01); *G06Q 10/06* (2013.01); *G06Q 10/06398* (2013.01)

(58) Field of Classification Search
CPC ............ G06F 17/30867; G06F 3/0481; G06F 3/04842; G06F 17/30994; G06T 11/20; G06Q 10/103; G05B 15/02
See application file for complete search history.

(56) References Cited

U.S. PATENT DOCUMENTS

| 7,705,847 B2 * | 4/2010 | Helfman | G06F 17/246 345/440 |
| 9,058,409 B2 * | 6/2015 | Chakra | G06F 17/30994 |
| 2003/0071814 A1 * | 4/2003 | Jou | G06F 9/542 345/440 |
| 2008/0060058 A1 * | 3/2008 | Shea | G06F 21/604 726/4 |

(Continued)

OTHER PUBLICATIONS

Tableau—"Getting Started with Tableau Desktop" obtained at http://www.tableausoftware.com/learn/training; downloaded circa Jun. 2013; 4 pages.

*Primary Examiner* — Rashawn Tillery
(74) *Attorney, Agent, or Firm* — Trellis IP Law Group, PC

(57) ABSTRACT

A system and method for facilitating rendering a user interface display screen or portion thereof. An example method includes determining context information associated with a user, wherein the context information includes use job role information; and employing the context information to select one or more visualization types from a set of available visualization types. The method may further include using the context information to provide one or more first user options to select one or more categories of data pertaining to a business task; referencing the one or more categories to facilitate determining one or more data attributes, dimensions, or measures associated with the context information; utilizing the one or more data attributes and the context information to select the one or more visualization types from the set of available visualization types; and providing a second user option to choose a visualization type from among selected visualization types.

19 Claims, 5 Drawing Sheets

(56) References Cited

U.S. PATENT DOCUMENTS

| | | | |
|---|---|---|---|
| 2010/0199181 A1* | 8/2010 | Robertson | G06Q 30/02 715/709 |
| 2014/0095396 A1* | 4/2014 | Naghshin | G06Q 10/103 705/301 |
| 2014/0365511 A1* | 12/2014 | Burrows | G06F 17/30867 707/754 |
| 2015/0105878 A1* | 4/2015 | Jones | G06F 9/44505 700/83 |

* cited by examiner

CONTEXTUALIZED REPORT BUILDING

CROSS REFERENCES TO RELATED APPLICATIONS

This application is related to U.S. Pat. No. 7,705,847, filed Mar. 5, 2007, entitled GRAPH SELECTION METHOD, which is hereby incorporated by reference as if set forth in full in this application for all purposes.

BACKGROUND

The present application relates to software and more specifically to user interface designs and methods for graphically displaying and interacting with data and/or concepts.

Software for facilitating information visualization, report generation, or analytic generation is employed in various demanding applications, including enterprise resource planning, scientific research, digital libraries, data mining, financial data analysis, market studies, manufacturing production control, drug discovery, and so on. Such applications often demand task-specific illustrative user interface display screens and accompanying visualizations for clearly illustrating data and accompanying characteristics, patterns, and interrelationships.

Space-efficient and illustrative visualizations are particularly important in enterprise applications, where data sets can vary widely, and where many types of visualizations may be available to render underlying data and provide associated software functionality. Visualizations for interpreting enterprise data may intuitively convey meaning inherent in underlying data and may include software functionality for exploiting the information to answer key business questions and to facilitate informed decision making.

Conventionally, software for visualization of enterprise data lacks effective mechanisms for facilitating custom visualization construction beyond specifying visualization source data and superficial visual encoding of rendered data attributes. For example, certain visualization software may include tools for facilitating creation of a pie chart from dimensions of a database table and may include user options for selecting colors for different slices of the pie chart.

Accordingly, conventional enterprise visualization software typically relies upon data characteristics to drive visualization creation, such that the resulting visualizations are tailored to the source data. However, users may not know what relationships they are seeking among data to be visualized, and consequently, may have difficulty selecting an appropriate visualization from a potentially large list of available visualizations.

Furthermore, users may become overwhelmed by potentially unnecessary or irrelevant source data, and users may not know what type of visualization to employ to render or otherwise display data. For example, a user may not know whether a pie chart, line graph, or tree diagram, sunburst visualization, or galaxy visualization would provide the most illustrative representation of the data for what the user is attempting to accomplish.

Hence, since users may not know what insight they seek or what questions they want answered, users often rely upon guesswork when selecting visualizations. However, such guesswork can inhibit informed decision making, resulting in potentially important decisions being made without critical insight.

SUMMARY

An example method facilitates guiding user selection of visualizations and rendering of associated user interface display screens or portions thereof. The example method includes determining context information associated with a user, wherein the context information includes use job role information; and employing the context information to select one or more visualization types from a set of available visualization types.

In an illustrative embodiment, the method further includes using the context information to provide a first user option to select one or more categories of data pertaining to a business task; referencing the one or more categories to facilitate determining one or more data attributes, dimensions, or measures associated with the context information and source data; utilizing the one or more data attributes and the context information to select the one or more visualization types from the set of available visualization types; providing a second user option to choose a visualization type from among the selected one or more visualization types; and accessing data pertaining to the one or more data attributes to generate instructions for rendering a visualization consistent with a visualization type chosen by a user via the second user option.

The step involving using the context information may further include providing the one or more user options, via a decision tree. The decision tree may facilitate user selection of a business task and one or more business objects in preparation for generation of an associated visualization. The context information may further include information characterizing a software application, such as Business Process Management (BPM) software application (and/or other enterprise software application(s)) communicating therewith, which launches or facilitates launching a process for implementing the method.

The step involving providing a second user option may further include displaying a set of user interface controls via a visualization picker. The visualization picker is adapted to provide user options for selecting visualization types (or visualization action categories) and sub-types for rendering a visualization characterized by a selected visualization type and/or sub-type.

Hence, certain embodiments discussed herein may employ business context information to enable users to build custom visualizations. Software implemented in accordance with systems and methods discussed herein may provide intuitive contextualized query building and visualization capabilities capable of mapping context-filtered business attributes to expressive visualizations consumed by enterprise applications. The leveraging of context information, such as user job role, BPM workflow, business tasks, and so on, to guide visualization creation, enables context-relevant selections of data attributes and associated visualizations.

Accordingly, such methods and associated mechanisms can be particularly insightful for users who lack upfront knowledge of what insight they are seeking from a visualization or exactly how answers to questions should be visually rendered. Conventionally, users may rely upon problematic guesswork when building visualizations, thereby potentially leading to uninformed decision making.

Recall that conventionally, visualizations are tailored to the data rather than to the users and associated tasks that the user wishes to perform. At best, conventional visualization techniques and accompanying user interface software provided users with a selection of visualization types based on data characteristics.

In summary, various embodiments discussed herein provide methods and mechanisms that may guide a user in selecting and triggering generation of expressive data visualizations that are tailored to their immediate needs.

A further understanding of the nature and the advantages of particular embodiments disclosed herein may be realized by reference of the remaining portions of the specification and the attached drawings.

DETAILED DESCRIPTION OF EMBODIMENTS

Figure 1:
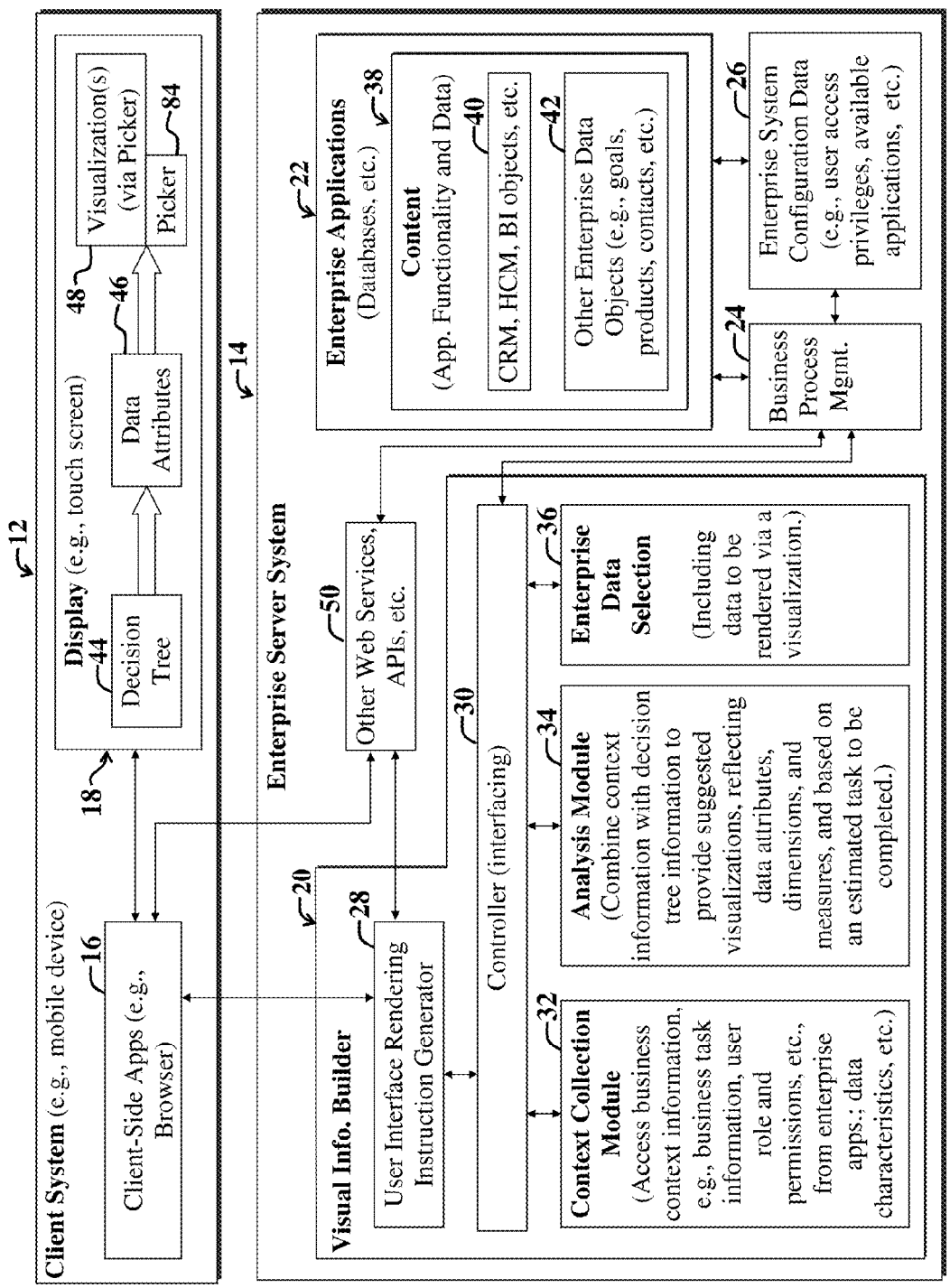
FIG. 1 is a diagram illustrating an example enterprise computing environment and accompanying system for facilitating selecting and rendering visualizations of data based on context information.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for an enterprise. A computing environment may be may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include Financials, Assets, Procurement, Projects, Supply Chain, and so on. The terms "enterprise software," "enterprise software application," and "enterprise application" may be employed interchangeably herein.

Enterprise software applications, such as Customer Relationship Management (CRM), Business Intelligence (BI), Enterprise Resource Planning (ERP), and project management software, often include databases with various database objects, also called data objects or entities. For the purposes of the present discussion, a database object may be any computing object maintained by a database.

A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

Enterprise data may be any information pertaining to an organization or business, including information about customers, appointments, meetings, opportunities, customer interactions, projects, tasks, resources, orders, enterprise personnel and so on. Examples of enterprise data include work-related notes, appointment data, customer contact information, descriptions of work orders, asset descriptions, photographs, contact information, calendar information, enterprise hierarchy information (e.g., corporate organizational chart information), and so on. The terms "enterprise data" and "business data" are employed interchangeably herein.

For clarity, certain well-known components, such as hard drives, processors, operating systems, power supplies, routers, Internet Service Providers (ISPs), the Internet, metadata services layers, and so on, have been omitted from the figures. However, those skilled in the art with access to the present teachings will know which components to implement and how to implement them to meet the needs of a given implementation.

FIG. 1 is a diagram illustrating an example enterprise computing environment and accompanying system 12, 14 for facilitating selecting and rendering visualizations based on context information. The system includes a client system 12, such as desktop computer or mobile device, in communication with an enterprise server system 14.

For the purposes of the present discussion, information visualization may be any process involving graphically representing data according to a method or scheme. A graphical representation of data resulting from an information visualization technique is called a visualization. Example visualizations include pie charts, treemaps, bar charts, line graphs, and so on.

The client system 12, also called a client device or client computer, includes client-side software applications, such as a browser 16, in communication with a display 18, such as a touch screen display of a smartphone. The client-side browser 16 communicates with applications 20, 22 running on the enterprise server system 14.

The example enterprise server system 14 includes a visual information builder application 20 in communication with enterprise software, including web services and/or Application Programming Interfaces (APIs) 50, which are both adapted to communicate with the client-side browser 16 and/or other client-side software applications. The enterprise server system 14 includes additional enterprise applications 22, such as CRM, HCM, and BI applications, that maintain enterprise content 38, including data and functionality. Examples of enterprise content include data and functionality maintained via various types of computing objects, such as CRM, HCM, and BI business objects 40 and other enterprise objects 42.

For the purposes of the present discussion, an object, such as a data object, may be any grouping of or encapsulation of data and/or functionality. Examples of objects include classes or structures implemented via object-oriented programming languages; tables, rows, or records of a database;

and so on. The terms "object" and "computing object" may be employed interchangeably herein.

Examples of computing objects include a note, appointment, a collection of information pertaining to particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment.

A business object may be any object used to organize information and/or functionality for business purposes. An example business object may be formed by creating a name for the business object, such as "CRM Opportunity 1" or "Goal 1" and then associating information with the name. For example, "CRM Opportunity 1" object may be associated with a conversation, one or more enterprise personnel, one or more kudos assigned to a team that is associated with the object, and so on. Data that is associated with a business object may be contained within a data structure or database associated with the object, or the information may be distributed among different applications, computers, and so on, without departing from the scope of the present teachings.

A representation of an object, i.e., a displayed object, may be displayed via graphical depiction, such as a node of a tree diagram, a menu item, dialog box, personnel icon, an entire user interface display screen, and so on. The graphical depiction of an object may also be called an object, a displayed object, or a node of a visualization.

The enterprise server system 14 further includes Business Process Management (BPM) software 24 in communication with the visual information builder 20 and other web services 50. Note that the visual information builder 20 may be implemented as a web service, which is launched via or otherwise managed via the BPM software 24. Similarly, the BPM software 24 may manage and/or launch various other web services 50 accessible to the client system 12.

The BPM software 24 is further adapted to facilitate communications between the visual information builder 20, web services 50, and back-end enterprise applications 20, such as CRM, HCM, BI applications, and so on. In the present example embodiment, the BMP software 24 further facilitates access to ERP system configuration data 26 and application content 38 by the web services 50 and visual information builder 20.

The example visual information builder 20 includes a controller 30 in communication with a user interface rendering instruction generator 28, a context collection module 32, an analysis module 34, and an enterprise data selection module 36. The controller 30 facilitates interfacing and coordinating communications between the various modules 28-36 and other back-end enterprise applications 22 via the BPM software 24. The BPM software 24 may be implemented as a type of middleware that that may coordinate web service work flows and perform various software interfacing functions.

For the purposes of the present discussion BPM software may be any collection of computing resources, e.g., software, hardware, memory, and so on, that is adapted to facilitate management of middleware processes or integration of or intercommunication between software services and accompanying tasks. BPM systems may facilitate designing, modeling, executing, monitoring, and optimizing applications that involve employing distributed functionality, e.g., functionality that is provided as software services that may be located at different locations on a network.

Software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

Business process management context information may be any context information pertaining to one or more running processes and/or software applications that the one or more processes interact with, including BPM workflows. Business context information may include any context information that is related to a business entity, e.g., a resource, software application, employee, enterprise task, opportunity, contact, and so on. The terms "business context information" and "business context" are employed interchangeably herein.

In general, context information may be any information that may be employed to inform the visual information builder 20 to facilitate selecting visualization types, data attributes of underlying data used to generate a visualization, and so on. Accordingly, context information includes any information pertinent to generation of a visualization but that may be auxiliary to the data itself, including but not limited to, user data, such as user privileges and job role, enterprise tasks, opportunities, and goals assigned to or associated with a user, business contact information, and so on.

Context information is said to be associated with a user if the context information is associated with a device or software accessible to the user. Such context information may pertain directly to the user and/or pertain to one or more tasks, opportunities, or other computing objects (e.g., business objects) that are associated with or otherwise employed by a user or used by software employed by the user.).

Note that in certain embodiments discussed herein, user context information may be derived, in part, with reference to a permissions database, such as the enterprise system configuration database 26, which stores user enterprise access permissions, e.g., software and data access and use privileges information.

User privileges information may be any permissions or specification of permissions associated with a user, wherein the permissions specify whether or not and/or how a user may access or use data, software functionality, or other enterprise resources. Accordingly, user privileges information, also simply called user permissions or user privileges, may define what a user is permitted or not permitted to do in association with access or use of enterprise resources, such as computing resources.

User job role information may include any data characterizing a position or description of a position held by the user at an enterprise. Accordingly, job role information may be a type of context information associated with the user, wherein the context information may also include user privileges information associated with the job role, i.e., position. For example, if a user is a system administrator employee, the user may have special permissions to change system configuration parameters and may then have access to various types of visualizations characterizing system architecture, operations, and so on.

The user interface rendering instruction generator 58 of the visual information builder 20 includes computer code for generating user interface displays screens with user interface controls 44 for selecting initial sets of relevant data attributes (i.e., relevant to the current context as identified via context information) and associated visualization types, and guiding user selection of visualization types.

In addition, the user interface rendering instruction generator 28 is adapted to selectively access underlying data from the enterprise data selection module 36 to enable generation of a visualization. The visualization is generated in accordance with a visualization type selected by a user from a group of automatically selected visualization types based on a set of automatically determined data attributes 46 characterizing the underlying data, i.e., source data or filtered source data.

For the purposes of the present discussion, underlying data may be any data used to generate a visualization, where nodes or components of the visualization may represent one or more objects, features, dimensions, measures, and/or other data characteristics, also called data attributes. Hence, underlying data may include information or functionality represented by or corresponding to a node, including link information. For example, a node representing a person in an enterprise organizational chart may be associated with additional underlying data that includes, for example, employee job title, phone number, address, and so on.

Note that a visualization may be coupled to or otherwise include one or more user interface controls, which are associated with software functionality, whereby user selection of the user interface control triggers execution of a software action.

A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an ERP software application, displaying a dialog box, and so on.

A business task may be any activity to be implemented via one or more resources of a business. For example a business task may include a software action involving updating a business object in a database.

A data attribute (also simply called attribute herein) may be any value or property characterizing data. Accordingly, an attribute of a visualization, node, or associated data, may refer to any characteristic of data used to generate a visualization, where the characteristic may be employed to group or otherwise organize or visually distinguish the data by adjusting features or characteristics of the visualization. Examples of attributes include data dimensions or layers, such as specified by row or column headers of tables used to store the data used for a visualization.

The example context collection module 32 of the visual information builder 20 includes computer code for communicating with the back-end enterprise applications 22 (e.g., via the BPM software 24) and/or other web services 50 to collect the context information. The context information may include, for example, information pertaining to a given business task that a user is working on (e.g., via the client system 12); information pertaining to or characterizing which client-side application and/or server-side web service 50 or other application that call the visual information builder 20 to facilitate displaying a visualization; information characterizing, describing, or otherwise associated with a user job role in an enterprise; user privileges information; enterprise data characteristics, including data attributes (e.g., dimensions, measures or metrics, and so on), and so on.

The analysis module 34 includes computer code for selectively combining context information (including associated data attributes, dimensions, and measures) with user input provided via the decision tree 44 (i.e., decision tree information, reflecting information characterizing user job role, a selected task, and/or a selected business object) to provided suggested visualizations. The suggested visualizations may represent a group of software-selected visualizations, wherein the selection of the visualizations is based on context information, which may include user-provided context information and/or automatically determined context information. Note that the terms "visualizations" and "visualization types" may be employed interchangeably herein, depending upon the context in which the terms are used.

The enterprise data selection module 36 is adapted to collect underlying data from the enterprise content 38 and/or via the web services 50, used to by the user interface rendering instruction generator 28 to generate instructions used by the client system 12 to generate one or more visualizations 48. In the present example embodiment, the one or more visualizations 48 have been selected via a user via a visualization picker 84 rendered in the display 18 of the client system 12. Note that the client system 12 and accompanying browser are adapted to render user interface display screens and accompanying features 44-48 based on rendering instructions retrieved via the user interface rendering instruction generator 28 of the visual information builder 20.

Note that various modules of the system 12, 14 may be combined with other modules and/or otherwise distributed about a network or repositioned, without departing from the scope of the present teachings.

In operation, the example visual information builder 20 is adapted to employ business context information, e.g., as provided via the context collection module 32, to facilitate generating user interface display screen features 44-48 that guide a user through triggering generation of a visualization based on or otherwise reflecting the context information. The visualization information builder 20 may be implemented as a stand-alone application that can be run server-side and invoked client-side via a browser, or may act as a component that is invoked via other web services 50 and/or enterprise applications 22 accessed via the client-side system 12 via the BPM system 24. Furthermore, in certain implementations, the visual information builder 20 may be implemented client side, such as part of an application running on the client system 12, without departing from the scope of the present teachings.

Initially, a decision tree 44 is displayed via the client display 18. The decision tree 44 may include a graphical representation illustrating various user options (e.g., as implemented via user interface controls) for facilitating selecting, determining, and/or narrowing relevant context information to be used to guide visualization selection. The decision tree 44 itself may be constructed based on user privileges and job role information, in addition to information characterizing which application launched or called the visual information builder 20. The decision tree 44 and may be adapted to enable a user to select a business object and associated task to be used for augmenting the context information of the context collection module 32.

For the purpose of the present discussion, a decision tree may be any mechanism for guiding user selection of options and/or entering of information consistent with a structure of the decision tree. The decision tree 44 discussed herein provides user options for selecting categories of data, where such categories may related to a business task, business object, or other entity.

After a user selects a business object or otherwise finishes interacting with the decision tree 44 and decides to proceed with generating a visualization, the visual information builder 20 automatically determines data attributes 46 (characterizing the underlying data) based on user input provided via the decision tree 44 and any preexisting context information (e.g., information pertaining to user job role, privileges, and information characterizing which application launched the information builder 20).

A visualization picker 84 is displayed in association with a visualization display area, also called a canvas, as discussed more fully below. A visualization picker may be any set of user interface controls adapted to enable a user to select a visualization type from among plural visualization types. The set of user interface controls may be implemented via a widget, form, questionnaire, and/or other mechanisms. For example, in the present example embodiment, the visualization picker 84 represents an interactive graphic with various buttons that may be user selected to register user selection of a visualization type or visualization action category and/or sub-type, as discussed more fully below with reference to FIGS. 2-4.

A user then employs the visualization picker 84 to select a visualization type and/or sub-visualization type from a set or group of visualizations that have been determined by the visual information builder 20 to be relevant to the current business context as determined with reference to collected context information maintained via the context collection module 32.

Note that the set or group of visualizations, i.e., visualization types is determined with reference to the context information, e.g., as provided via the context collection module 32. When the current context is determined at any step of the visualization-construction guiding process (e.g., represented via the displayed user interface features 44-48, 84 in the display 18), the context collection module 32 may generate a signal that includes the context information. The signal may then be forwarded to the user interface rendering instruction generator 28.

The user interface rendering instruction generator 28 then uses information contained in the signal to determine, i.e., select one or more visualization types (e.g., a set of selected visualization types, individual types of which are user-selectable via the picker 84) and associated data attributes 46 to be made available to the user via the client-side display 18.

Hence, the visual information builder 20 represents an interactive framework that provides intuitive contextualized query building and visualization capabilities. The present example embodiment represents a software solution that is adapted to guide users, including causal or inexperienced users, through a process of mapping business attributes to expressive visualizations which can then be consumed in enterprise applications.

Accordingly, the present example embodiment leverages surrounding context (user job role information, business process management workflow information, business task information, and so on) to facilitate guiding end users through the visualization creation process; presenting users with a context-based selection of business attributes that are relevant to the business task users wish to create a visualization for; as well as presenting estimates of relevant visualization types usable to render underlying data in an efficient and effective manner.

In summary, instead of providing users with a list of all possible business attributes in a database or data source (as may be conventionally done), the visual information builder 20 delivers a selection of business data optimized for a specific business task. The business task may be automatically determined via the visual information builder 20 and/or with reference to user input provided via the decision tree 44. The graphical decision tree 44 is adapted to assist end users in formulating what business task they wish to visualize based on their business role (also called job role).

The starting point of the graphical decision tree 44 may be determined based on the user role and BPM context from which the visual information builder 20 has been launched. Accordingly, if the component 20 is invoked from an order exception page in a distributed order orchestration application for instance, users will see options specific to the order exception management process. The options may manifest, for example, in the decision tree 44 and the visualization picker 84. Similarly, if the visual information builder 20 is launched from a requisition page in an HCM application, the visual information builder 20 may facilitate display of information related to recruiting process only.

User job role information may also play a role in the display of possible options in the graphical decision tree 44. Accordingly, a senior level Human Resources (HR) manager may not see the same options in the decision tree 44 as would an individual contributor.

When users have identified the business task they would like to visualize, e.g., via the graphical decision tree 44, the visual information builder 20 may then facilitate display of a selection of business attributes 46, dimensions, and measures most relevant to this particular task. This may help casual users make optimal choices based on what they would like to achieve, instead of being overwhelmed by unnecessary information from the data source or presented by standard information preset by an Information Technology (IT) department, and which is not necessarily relevant to their role and tasks.

Note that the visual information builder 20 uniquely leverages context information to facilitate presenting users with a selection of visualizations tailored to one or more business tasks they selected via the graph decision tree 44.

In addition to leveraging the business context information (e.g., job role, BPM workflow, business task information, as selected in the decision tree 44), the visual information builder 20 may also leverage an algorithm discussed more fully in U.S. Pat. No. 7,705,847, entitled GRAPH SELECTION METHOD, which is incorporated by reference herein in full.

Figure 3:
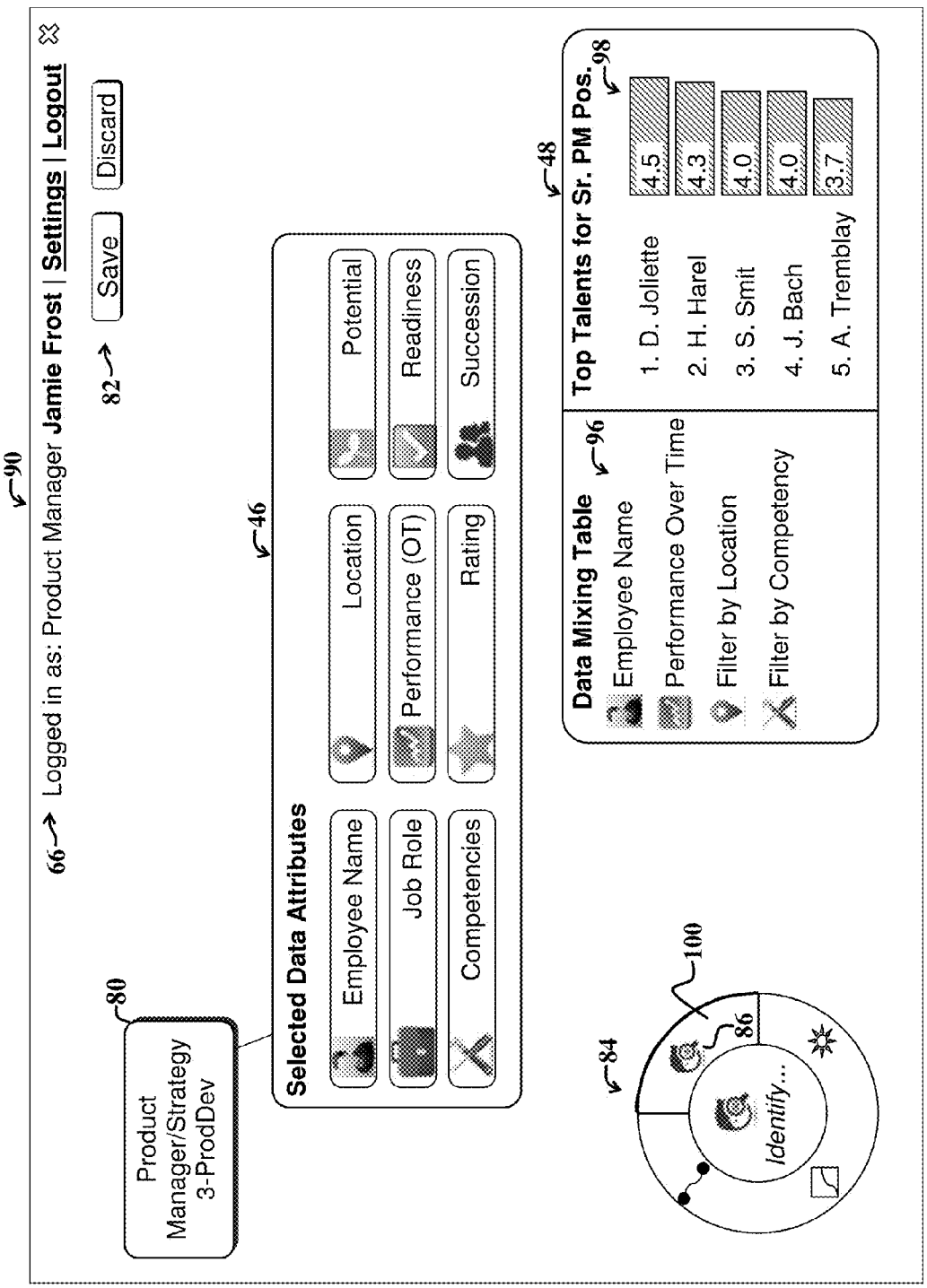
FIG. 3 illustrates a second example user interface display screen illustrating selected data attributes and an example visualization generated in response to user interaction with the user interface display screen of FIG. 2.

The algorithm discussed in the above-identified US Patent facilitates enabling users to select the suitable graphs based on data characteristics (identified via the decision tree 44), visualization tasks (as provided by a decision table as shown in FIG. 3 of the above-identified US Patent) and user roles.

The selection of the suitable graph for a specific business task is further facilitated through the use of the visualization picker 84. The visualization picker 84 may be implemented as an interactive roulette or widget, which dynamically categorizes the relevant visualizations (that may have been selected based on the above-mentioned business context and algorithm), under categories of visualization action types. Using this picker 84, users can pick the most adequate or suitable available visualization to display underlying data depending on whether the users would like to identify results of an analysis, compare results, see trends or correlations, etc.

By focusing the selection of visualizations on end users and their tasks, the visual information builder 20 allows the user to rapidly filter relevant graph types for the business tasks he/she wants to perform, thereby facilitating the visualization creation process for casual end users and avoiding guesswork and potential errors resulting from standard business attributes and visualization selection process.

Accordingly, the contextualized approach of the visual information builder 20 may limit the selection of business attributes and visualizations to relevant choices based on the user's job role, BPM context information, the task they want to complete, and data characteristics.

Figure 2:
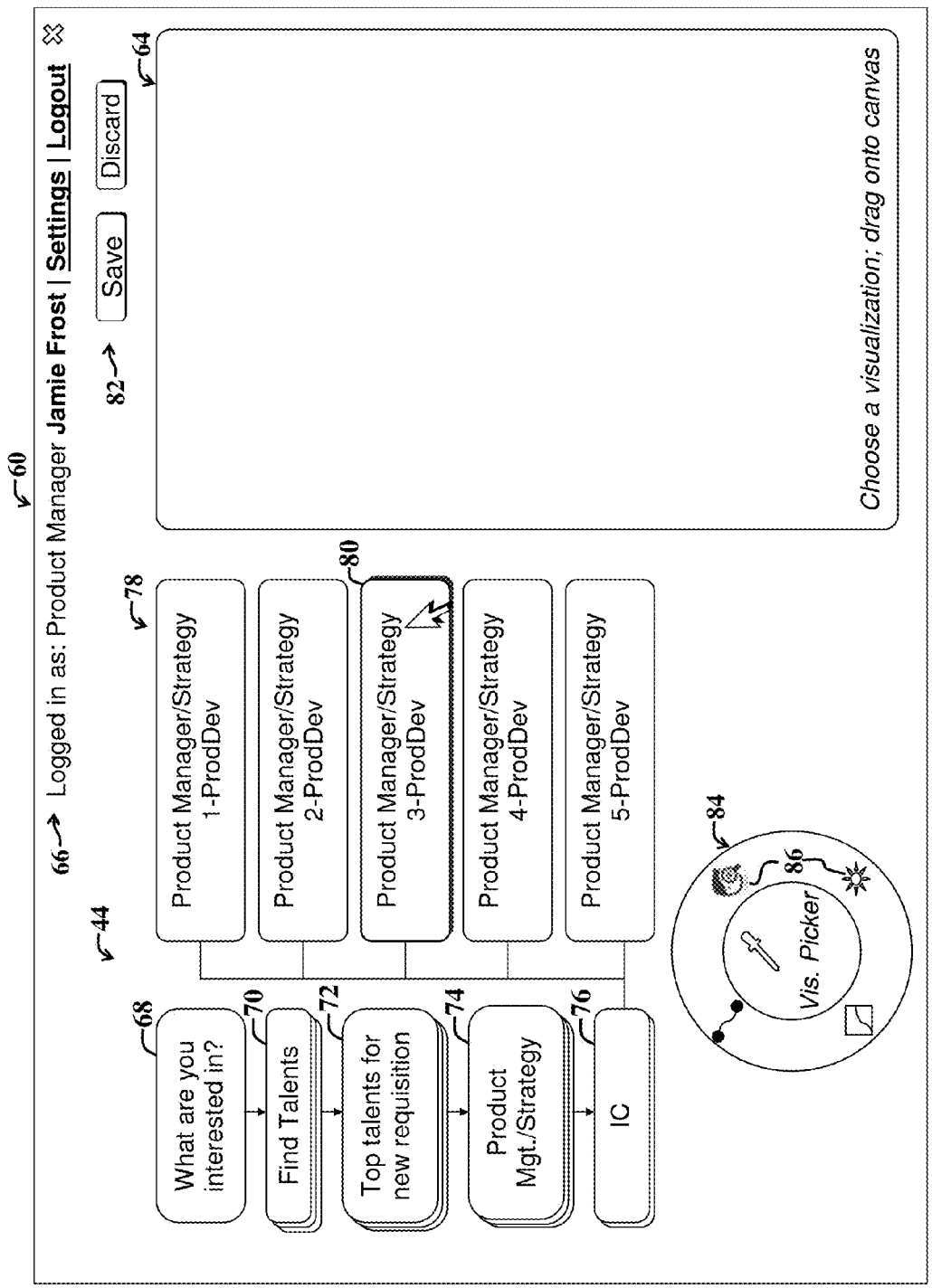
FIG. 2 illustrates a first example user interface display screen showing an example decision tree, visualization picker, and visualization display area, which may be implemented via the system of FIG. 1.

FIG. 2 illustrates a first example user interface display screen 60 showing an example decision tree 44, visualization picker 84, and visualization display area 64, also called a canvas or canvas section. The user interface display screen 60 may be implemented via the system of FIG. 1.

For the purposes of the present discussion, a user interface display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

The first example user interface display screen 60 includes a header 66 indicating user log-in information, which is associated with user privileges and job role information, and which may form part of the context information used to generate various features 44, 84, 64 of the user interface display screen 60.

The example decision tree 44 includes various steps 68-76, which graphically depict user options for performing various selections indicated via the steps 68-76. For example, the steps 68-76 include a first prompting step 68, which prompts the user to indicate what the user is interested in. As a product manager, the user (e.g., Jamie Frost) may indicate that they are interested in finding talent 70 for a new requisition 72 to facilitate implementing a product management strategy 74 for a new Integrated Circuit (IC) 76.

In the present example embodiment, the user has selected the IC step 76, which triggers display of indications of various associated computing objects 78 or information categories pertaining to five different IC products. The user then selects the third IC object 80. Note that a user may, at any time, select and drag one of the object representations 78 to the canvas 64 to automatically generate a visualization based on context information derived via user interaction with the decision tree 44, user job role, user privileges, and information pertaining to the software that launched the software application that is rendering the user interface display screen 60.

Alternatively, a user may manipulate the visualization picker 84 to first select a visualization type from among plural visualization types 86 indicated via icons in the visualization picker 84. Note that in certain implementations, user selection of one of the visualization-type icons may trigger display of any sub-types of visualizations associated with a given type of visualization indicated via the one or more visualization-type icons 84.

Save and discard user interface controls 82 (implemented as buttons in the present example embodiment), are adapted to provide user options to save or discard changes made to the decision tree 44, and/or visualization canvas 64, respectively.

Accordingly, the decision tree 44 represents an in-context graphical decision tree that is adapted to provide user options for end users to formulate what they would like to see in their visualization and to identify relevant business data and actions.

The graphical decision tree 84 leverages the BPM context information passed on by the enterprise applications that calls the associated visualization information builder, as well as job roles, to facilitate determining where to start the process via the graphical decision tree 44. The graphical decision tree 84 is adapted to guide end users through a series of steps that will help them determine what they would like to focus on in the subsequently displayed visualization.

FIG. 3 illustrates a second example user interface display screen 90 illustrating selected data attributes 46 and an example visualization 48 generated in response to user interaction with the user interface display screen 60 and accompanying decision tree 44 of FIG. 2.

Note that in the present example embodiment, a user has employed the visualization picker 84 to select a first visualization type represented by a visualization-type icon 86. User selection of the visualization-type icon 86 results in highlighting (or otherwise visually distinguishing) a sector 100 of the visualization picker 84 that includes the selected visualization-type icon 86.

The resulting displayed visualization 48 is of the type selected via the visualization picker 84 and associated selected icon 86. The rendered visualization 48 is based on automatically selected data attributes 46, which are in-turn based on the user selected business object 80. Note that in certain implementations, user options for further selecting, changing, omitting, or adding data attributes 46 may be provided, without departing from the scope of the present teachings.

The example visualization 48 includes a data mixing table section 96, which illustrates selected data attributes used to generate graphics 98 in an adjacent top talents section of the visualization 48. Note that the visualization 48 may include various additional user options and associated user interface controls for manipulating, augmenting, or otherwise changing the visualization 48 and/or underlying data rendered thereby.

Accordingly, as shown in FIG. 3, instead of merely presenting users with a list of all data attributes associated with data maintained in data source, the user sees a list of business data 46 relevant to their job role; the context where the builder has been launched; and the business task (e.g., as indicated via the object representation 80) that the user would like to accomplish.

Note that while certain embodiments discussed herein pertain to generation of visualizations, embodiments are not limited thereto. For example, certain methods and accompanying systems discussed herein may be adapted for use in generating other user interface features, e.g., windows, tables, reports, and other analytics, without departing from the scope of the present teachings.

For the purposes of the present discussion, an analytic may be any calculation or measurement based on a given input. Certain analytics may be displayed graphically. For example, an analytic that calculates a degree of a match between a user and a candidate position based on information about the user and various candidate positions may be displayed via a bar chart. In general, for the purposes of the present discussion, a graphically displayed analytic or other visual representation of data is considered to be a type of visualization.

Figure 4:
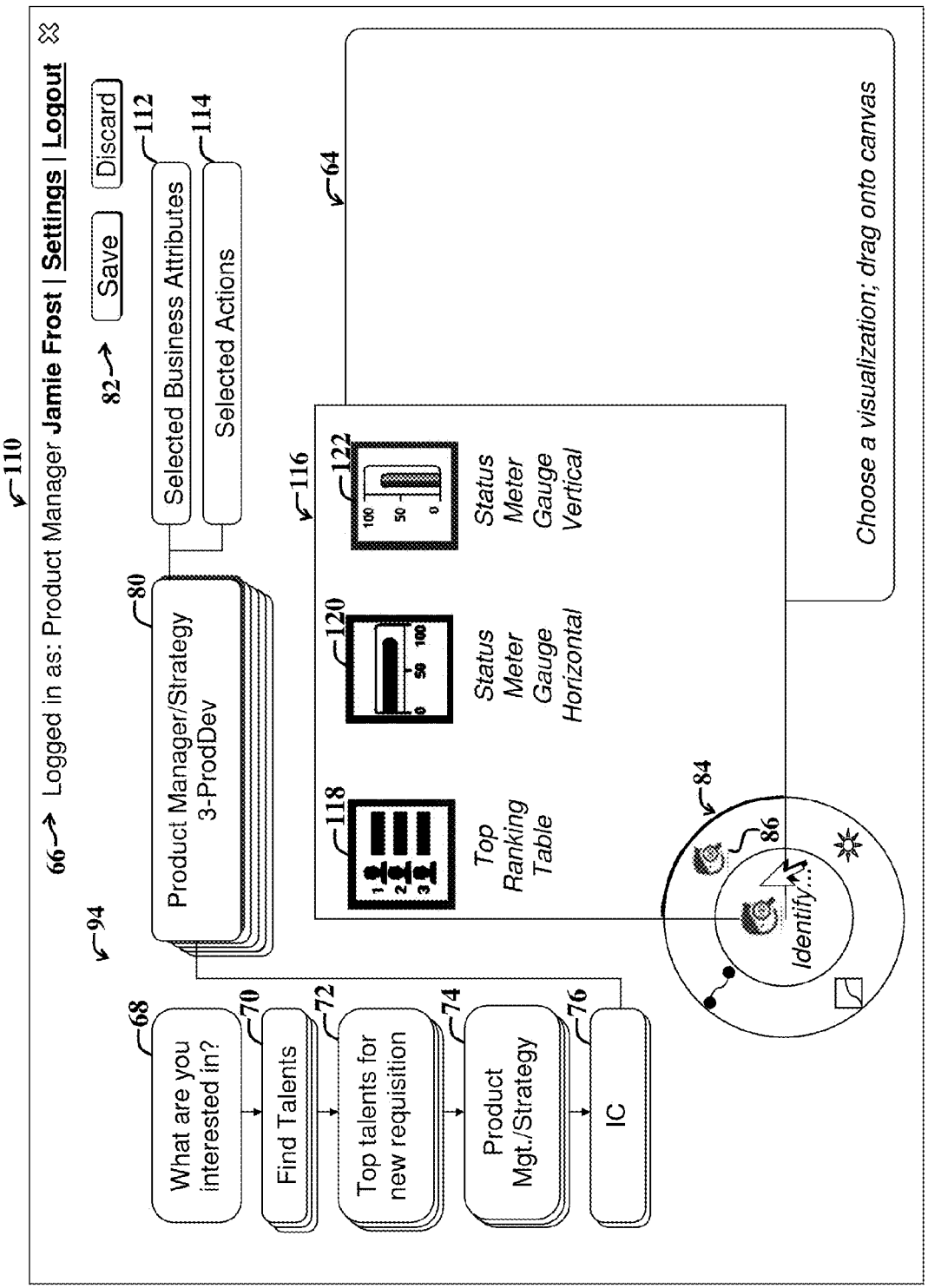
FIG. 4 illustrates a third example user interface display screen illustrating an updated decision tree after selection of task category and associated attributes and actions, and further illustrating various user options for selecting a specific sub-type of visualization from a visualization picker.

FIG. 4 illustrates a third example user interface display screen 110 illustrating an updated decision tree 94 after user selection of a task category, e.g., as represented via the object 80, and associated attributes 112 and actions 114, and further illustrating various user options 118-122 for selecting a specific sub-type of visualization from the visualization picker 84.

Note that in the updated decision tree 94, the various object representations 78 of FIG. 2 have been collapsed under the selected object representation 80. Furthermore, additional indicators 112, 114 show that business attributes 112 and visualization actions 114 have been associated with the selected object representation 80.

In the present example user interface display screen 110, the user has selected a visualization type by selecting a corresponding icon 86 from the visualization picker 84. However, the selected visualization type is associated with various user-selectable sub-types, as represented via user selection-options 118-122. Note that a given visualization type may correspond to or represent a category of visualization action types, wherein the sub-types represent particular visualization actions.

The example user-selectable visualization sub-types include a top-ranking table visualization sub-type 118, a status meter gauge horizontal visualization sub-type 120, and a status meter gauge vertical visualization sub-type 122. A user may select one of the visualization sub-types 120-122 to trigger rendering of a visualization characterized by the selected visualization sub-type and based on underlying data and accompanying context-specific data attributes.

The visualization picker 84, which may be implemented via a roulette widget, is further adapted to provide user options to select what visualization tasks or actions 114 they would like to use for their visualizations (identify, compare, see trends, see correlation, etc.).

Accordingly, the visualization picker 84 represents an interactive roulette adapted to dynamically categorize relevant visualizations (e.g., as selected based on the above-identified business context and algorithm), under categories of visualization action types. Using this tool 84, users can pick the most adequate visualization depending on whether they would like to identify results of an analysis, compare results, see trends or correlations, and so on.

Hence, by focusing the selection of visualizations on end users and their tasks, the underlying visual information builder (e.g., visualization information builder 20 of FIG. 1) allows the user to rapidly filter relevant graph types for the business tasks they wish to perform, thereby facilitating the visualization creation process for casual end users and avoiding guesswork and potential errors resulting from standard business attributes and visualization selection process.

Figure 5:
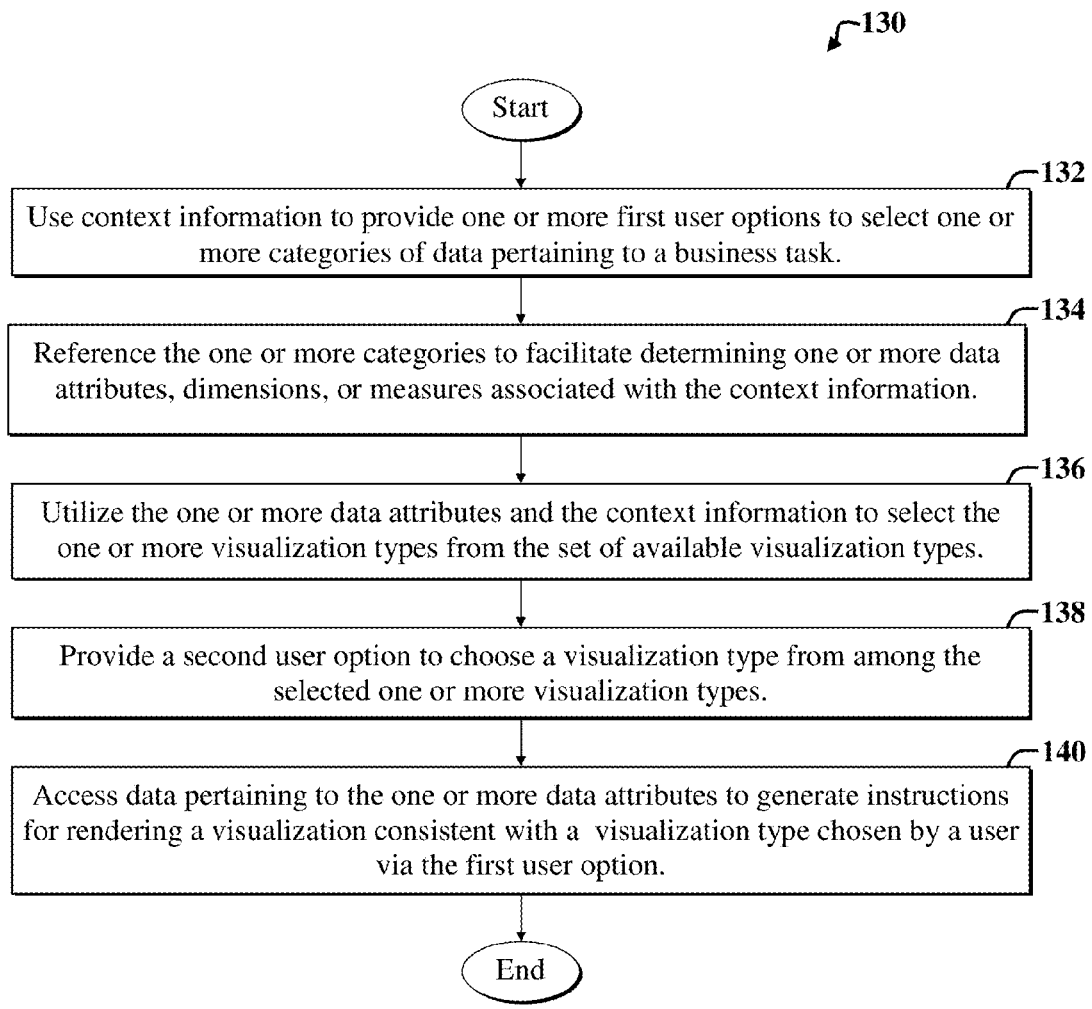
FIG. 5 is a flow diagram of an example method adapted for use with the embodiments of FIGS. 1-4.

FIG. 5 is a flow diagram of an example method 130 adapted for use with the embodiments of FIGS. 1-4. The example method 130 is adapted to facilitate rendering a user interface display screen or portion thereof based on context information.

The example method 130 includes a first step 132, which involves using the context information to provide one or more first user options to select one or more categories of data (e.g., pertaining to the object representations 78 of FIG. 2) pertaining to a business task (e.g., as represented by the one or more tasks indicated in the decision tree 44 of FIG. 2).

A second step 134 includes referencing the one or more categories to facilitate determining one or more data attributes, dimensions, or measures associated with the context information, e.g., as indicated via the data attributes section 46 of FIG. 3.

A third step 136 includes utilizing the one or more data attributes and the context information to select the one or more visualization types from the set of available visualization types. The selected visualization types may be represented in or otherwise accessible via or associated with a visualization picker, such as the visualization picker 84 of FIGS. 1-4.

A fourth step 138 includes providing a second user option (e.g., via the visualization picker 84 of FIGS. 1-4) to choose a visualization type from among the selected one or more visualization types.

A fifth step 140 includes accessing data pertaining to the one or more data attributes to generate instructions for rendering a visualization consistent with a visualization type chosen by a user via the first user option.

Note that the method 130 may be altered, such as by removing steps, adding steps, and/or changing steps, without departing from the scope of the present teachings. For example, the first step 132 may be augmented to include providing the one or more user options via a decision tree that is adapted to enable a user to select a business task and one or more business objects in preparation for generation of an associated visualization.

The context information may include user privileges information, information characterizing one or more user tasks, information characterizing a business process management workflow associated with the user, one or more characteristics of data to be represented via a visualization, and so on.

The method 130 may further include using the context information to automatically select one or more attributes to be employed by the visualization. The one or more attributes may include one or more attributes characterizing a user task indicated via the context information.

The method 130 may further include employing one or more automatically selected attributes and the context information to automatically select the one or more visualization types, and then employing one or more selected visualization types to display a decision tree. A user option may be provided in association with the decision tree, to select a visualization type for displaying data.

The method 130 may further include determining data and software functionality to be rendered via a visualization and then automatically generating a visualization based on a user selection chosen from among the automatically selected one or more visualization types and the determined data.

A more generalized method for facilitating rendering a user interface display screen or portion thereof includes determining context information associated with a user, wherein the context information includes use job role information; and employing the context information to select one or more visualization types from a set of available visualization types.

Accordingly, certain embodiments discussed herein provide context-specific tools tailored to the users and other context information to facilitate timely informed decision making via visualizations that are organically adapt to the business tasks that users want to perform. The contextualized approach of the visual information builder (block 20 of FIG. 1) discussed herein makes this possible and enables casual users, who are not necessarily BI or IT experts, to readily build visualizations that can help them answer critical business questions in a timely fashion.

Accordingly, the visual information builder may democratizes visual report and visualization building capabilities, as casual business users, who are not necessarily versed in analytics, can now easily create expressive visualization and ad-hoc reports.

Although the description has been described with respect to particular embodiments thereof, these particular embodiments are merely illustrative, and not restrictive. For example, while various embodiments discussed herein are adapted to help guide a user through the visualization selection and implementation process, embodiments are not limited thereto. For example, underlying software mechanisms used to narrow sets of applicable data attributes and visualizations based on context information may automatically select data attributes and choose a specific visualization to render, without departing from the scope of the present teachings.

Furthermore, embodiments are not limited to enterprise applications involving rendering of enterprise data based on context information. For example, various computing environments, e.g., university or government computing environments, may be mined for context information to facilitate implementing visualizations and associated user interface display screens and visualization-construction guidance methods discussed herein, without departing from the scope of the present teachings.

In addition, note that while various embodiments are discussed herein with respect to visualizations, that other types of user interface display screen components may be generated via similar methods and mechanisms as discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating generating a report, the method executed at least in part by a processor coupled to a user input device and to a display screen, the method comprising:

launching a visual information builder software application in response to a call received from a business process software application processing a business task selected by a user;

determining with respect to a state of the business process software application associated with the launching of the visual information builder software application context information associated with the business task and the user;

using the context information to display a decision tree on the display screen;

using the context information to determine a starting point of the decision tree and user options specific to the business task;

determining data attributes characterizing underlying data associated with the business task;

filtering the data attributes based on the context information to form a set of filtered data attributes; and determining from the set of filtered data attributes and the context information a set of visualizations types relevant to the user.

2. The method of claim 1, further including:

providing the user options to select one or more categories of data pertaining to the business task;

referencing the one or more categories to facilitate determining one or more data attributes, dimensions, or measures associated with the context information and data;

utilizing the one or more data attributes and the context information to select one or more visualization types from the set of visualization types;

providing a second user option to choose a visualization type from among the selected one or more visualization types; and accessing data pertaining to the one or more data attributes to generate instructions for rendering a visualization consistent with a visualization type chosen by a user via the second user option.

3. The method of claim 2, wherein using the context information includes selecting one or more business objects in preparation for generation of an associated visualization.

4. The method of claim 3, wherein the context information includes information pertaining to a job role of a user and information characterizing the business process software application that launches a process for implementing the method.

5. The method of claim 4, wherein the business process software application includes enterprise software.

6. The method of claim 2, wherein providing includes displaying a set of user interface controls via a visualization picker.

7. The method of claim 6, wherein the visualization picker is adapted to provide user options for selecting a sub-type of a given visualization type for rendering a visualization characterized by the given visualization type.

8. The method of claim 1, further including:

accessing data to be visualized;

determining a visualization type from among selected one or more visualization types in accordance with one or more characteristics of the data to be visualized and in response to user input provided via the decision tree; and rendering a visualization of the data, wherein the visualization is characterized by the visualization type.

9. The method of claim 8, wherein the context information includes user privileges information.

10. The method of claim 8, wherein the context information includes information characterizing one or more user tasks.

11. The method of claim 8, wherein the context information includes information characterizing a business process management workflow associated with the user.

12. The method of claim 8, wherein the context information includes one or more characteristics of data to be represented via the visualization.

13. The method of claim 8, wherein determining further includes using the context information to automatically select one or more attributes to be employed by the visualization.

14. The method of claim 13, wherein the one or more attributes include one or more attributes characterizing a user task indicated via the context information.

15. The method of claim 13, wherein employing further includes employing one or more automatically selected attributes and the context information to automatically select the one or more visualization types.

16. The method of claim 15, further including employing one or more selected visualization types to display the decision tree, and including a user option, presented in association with the decision tree, to select a visualization type for displaying data.

17. The method of claim 8, further including determining data and software functionality to be rendered via a visualization and automatically generating the visualization based on a user selection chosen from among the selected one or more visualization types and the determined data, and providing a visualization picker to facilitate providing a user option to input the user selection.

18. An apparatus comprising:

a digital processor coupled to a display screen, a user input device, and to a processor-readable storage device, wherein the processor-readable storage device includes one or more instructions executable by the digital processor to perform the following acts:

launching a visual information builder software application in response to a call received from a business process software application processing a business task selected by a user;

determining with respect to a state of the business process software application associated with the launching of the visual information builder software application context information associated with the business task and the user;

using the context information to display a decision tree on the display screen;

using the context information to determine a starting point of the decision tree and user options specific to the business task;

determining data attributes characterizing underlying data associated with the business task;

filtering the data attributes based on the context information to form a set of filtered data attributes;

determining from the set of filtered data attributes and the context information a set of visualizations types relevant to the user.

19. A non-transitory processor-readable storage device including instructions executable by a digital processor, the processor-readable storage device including one or more instructions for:

launching a visual information builder software application in response to a call received from a business process software application processing a business task selected by a user;

determining with respect to a state of the business process software application associated with the launching of the visual information builder software application context information associated with the business task and the user;

using the context information to display a decision tree on a display screen, using the context information to determine a starting point of the decision tree and user options specific to the business task;

determining data attributes characterizing underlying data associated with the business task;

filtering the data attributes based on the context information to form a set of filtered data attributes;

determining from the set of filtered data attributes and the context information a set of visualizations types relevant to the user.

* * * * *

UNITED STATES PATENT AND TRADEMARK OFFICE
CERTIFICATE OF CORRECTION

| | | |
|---|---|---|
| PATENT NO. | : 9,576,263 B2 | Page 1 of 1 |
| APPLICATION NO. | : 14/032172 | |
| DATED | : February 21, 2017 | |
| INVENTOR(S) | : Beck et al. | |

It is certified that error appears in the above-identified patent and that said Letters Patent is hereby corrected as shown below:

In the Specification

In Column 5, Line 57, delete "that that" and insert -- that --, therefor.

In the Claims

In Column 18, Line 50, in Claim 19, delete "screen," and insert -- screen; --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*